United States Patent [19]

Shimizu

[11] Patent Number: 4,924,260
[45] Date of Patent: May 8, 1990

[54] EXPOSURE SYSTEM OF IMAGE FORMING APPARATUS

[75] Inventor: Kenichi Shimizu, Kawasaki, Japan

[73] Assignee: Polaroid Corporation, Cambridge, Mass.

[21] Appl. No.: 315,898
[22] PCT Filed: Jun. 23, 1988
[86] PCT No.: PCT/JP88/00622
§ 371 Date: Feb. 16, 1989
§ 102(e) Date: Feb. 16, 1989

[30] Foreign Application Priority Data

Jun. 23, 1987 [JP] Japan ............... 62-154546

[51] Int. Cl.$^5$ ............................. G03B 27/72
[52] U.S. Cl. ........................ 355/69; 355/70
[58] Field of Search ................... 355/68–70

[56] References Cited

U.S. PATENT DOCUMENTS 4,255,046  3/1981  Corona ................... 355/68
4,334,767  6/1982  Lehman .................. 355/68
4,551,011 11/1985  Yuasa et al. ......... 355/69 X

FOREIGN PATENT DOCUMENTS 56-164363 12/1981 Japan .
57-78030 5/1982 Japan .
57-89748 6/1982 Japan .

OTHER PUBLICATIONS

L. J. Mason, "Aperture Control of Integrating Cavity Flash Lamp Exposure" Xerox Disclosure Journal, vol. 11, No. 2, Mar./Apr. 86, pp. 77-78.
H. M. Harris, "Adaptive Illumination Balancing System" Xerox Disclosure Journal, vol. 4, No. 6, Nov./Dec. 79, p. 787.
L. J. Mason, "Exposure Control with Multiple Flash Lamps" Xerox Disclosure Journal, vol. 10, No. 5, Sep./Oct. 89, pp. 295-296.

Primary Examiner—L. T. Hix
Assistant Examiner—D. Rutledge
Attorney, Agent, or Firm—Alfred E. Corrigan

[57] ABSTRACT

For obtaining a required amount of exposure on a light sensitive film in an image forming apparatus in which a plurality of flash lamps disposed in opposition to the original are lit for exposure of the original to form a copied image on a light sensitive film, the individual flash lamps are alternately lit a plurality of times, respectively, even when the requisite quantity of light can be obtained by lighting alternately only once each of the flash lamps, to thereby prevent nonuniformity of exposure of the film due to the reciprocity law failure.

3 Claims, 4 Drawing Sheets

| SEQUENCE OF LAMP LIGHTING | TRANSMISSIVITY OF FILM(%) | | |
|---|---|---|---|
| | FRONT PORTION OF FILM | CENTER PORTION | REAR PORTION |
| FRONT→REAR | 11.7 | 10.6 | 9.5 |
| REAR→FRONT | 9.5 | 10.6 | 11.7 |

EXPOSURE SYSTEM OF IMAGE FORMING APPARATUS

RELATED APPLICATION

This application is related to my copending application Ser. No. 315,897 filed Feb. 16, 1989.

TECHNICAL FIELD

The present invention relates to an image forming apparatus and more particularly to an exposure system of the image forming apparatus which is advantageously suited for forming an image on a light sensitive film.

BACKGROUND TECHNOLOGY

Heretofore, preparation of a slide used in connection with various lectures has been conducted in such a manner in which a 35-mm camera 101 is fixedly mounted on a stand 102, facing downwardly, wherein an original 105 is illuminated by light sources 103 such as flash lamps or the like supported on the stand 104 with photographing being carried out by releasing a shutter of the camera 101, as is shown in FIG. 6. In that case, operator is required to adjust the height of the camera in dependence on the size of the original 105 for the purpose of proper focussing. Besides, shutter speed and aperture value have to be determined in dependence on the species of the original 105, the type of the light source 103 and brightness thereof.

Such operation however requires skillfulness, and it was difficult to prepare a desirable slide unless operator has knowledge of the photographical technology.

With a view to eliminating the shortcomings of the prior art mentioned above to thereby provide an image forming apparatus capable of forming a clear image through simplified manipulation without requiring skillfulness, the applicant of this application has made a proposal disclosed in Patent Application No. SHO 62-95374.

This apparatus includes an original supporting stage, a light source for illuminating an original disposed on the stage, sensitive film holding means for holding detachably a light sensitive film at an image position, an imaging optical system for guiding light reflected from the original to the light sensitive surface of the abovementioned film, a shutter disposed in the imaging optical system for controlling the exposure of the light sensitive film switch means outputting a start signal for initiating the photographing on the light sensitive film, and an operation controller outputting control signals at least for the abovementioned light source and shutter.

The length of optical path extending from the abovementioned light source to the light sensitive film is previously determined. The operation controller mentioned above is characterized by such arrangement that it outputs sequentially a shutter opening signal for opening the shutter, lighting means for causing the light source to emit light a predetermined number of times and a shutter closing signal for closing the shutter.

However, the technique described above has been attended with a new problem that the image suffers from unevenness in density.

The present invention has been made in view of the background described above and contemplates as an object to eliminate unevenness in the density of the photographed image.

DISCLOSURE OF THE INVENTION

The gist of the present invention resides in that a plurality of flash lamps are lit sequentially with a quantity of light which gives rise to no unevenness in the exposure of film due to the influence of reciprocity law failure.

BEST MODE OF CARRYING OUT THE INVENTION

In the following, an exemplary embodiment of the present invention will be described on the basis of the drawings.

Figure 1:
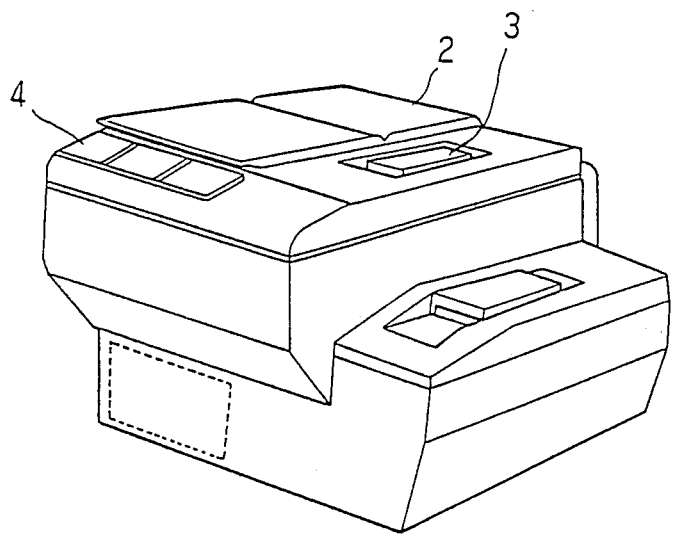
FIG. 1 is a view showing an external appearance of an image forming apparatus with which the present invention is concerned.
Figure 2:
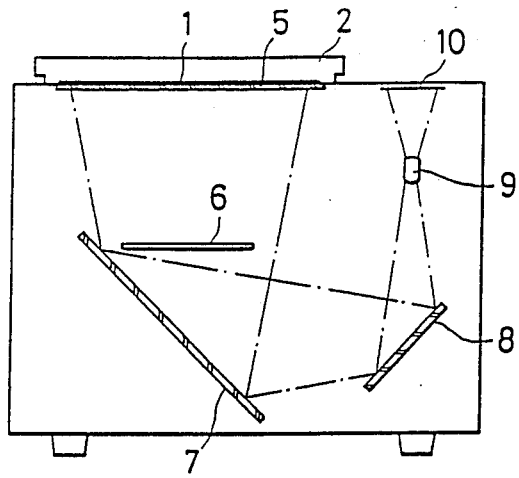
FIG. 2 is a front view showing schematically an optical system portion of the same.
Figure 3:
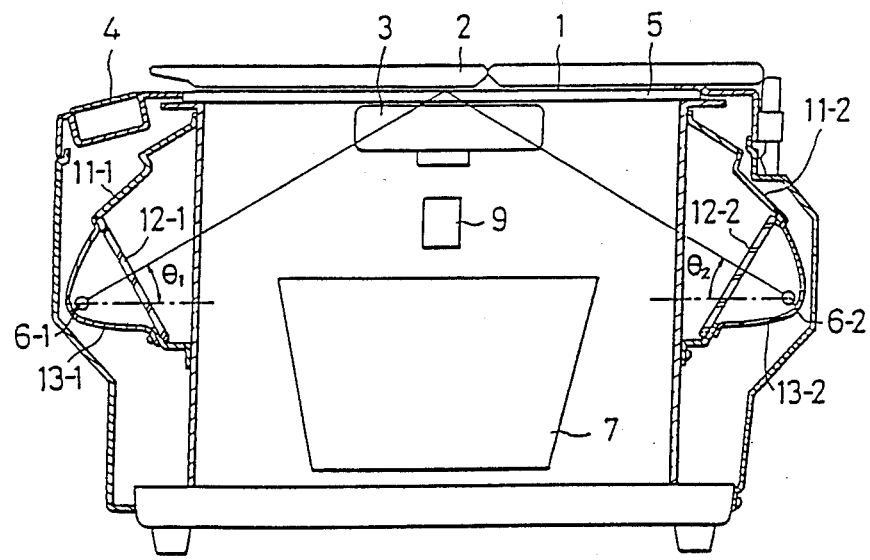
FIG. 3 is a side view of the same.
Figures 4, 5:
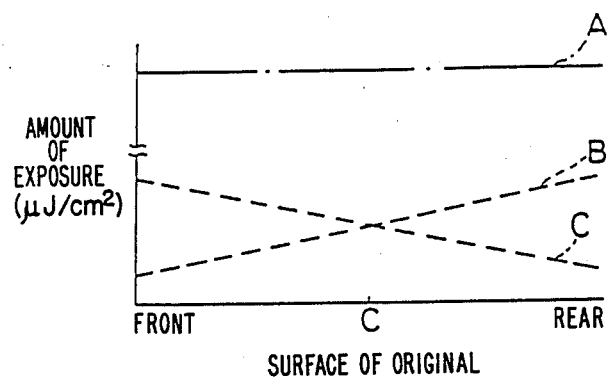
FIG. 4 is a view illustrating relationships between a surface of an original and amount of exposure as realized by an exposure control according to the present invention.
FIG. 5 is a view showing relationships between lamp lighting sequences and transmission factor of a film.
Figure 6:
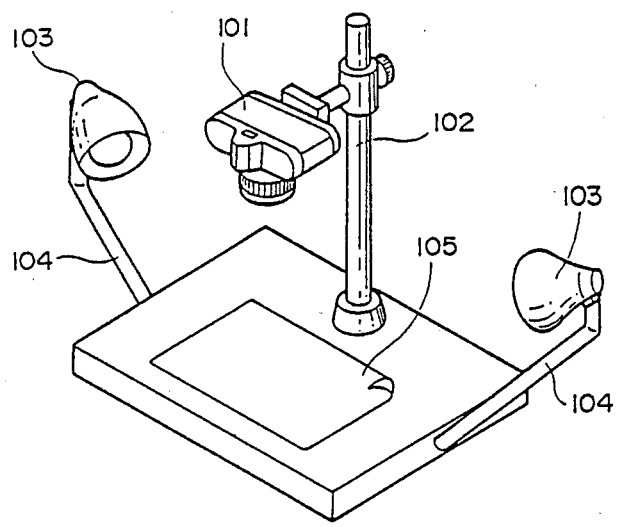
FIG. 6 is a view illustrating pictorially a slide preparation mode known heretofore.

FIG. 1 shows an external appearance of an image forming apparatus which the present invention concerns, FIG. 2 is a front view showing schematically an optical system portion thereof, FIG. 3 is a side view of the same, FIG. 4 is a view showing relationships between a surface of an original and the amount of exposure as realized by the exposure control according to the present invention, and FIG. 5 is a view showing relationships between lamp lighting sequences and transmission factor of a film.

In FIG. 1, the image forming apparatus includes an original holding press plate 2, a photographing camera 3 and a manipulating field 4.

In FIG. 2, an original 1 is disposed on a contact glass plate 5 and held down by the press plate 2. The original 1 is illuminated by the flash lamp 6, wherein light reflected from the original 1 is reflected at a first mirror 7 and a second mirror 8 and focused onto a film 10 by passing through a taking lens 9. The film 10 is placed within the camera 3 and exposed to the light upon opening of the shutter in synchronism with emission of light from the flash lamp 6.

In FIG. 3, a pair of flash lamp units 11-1 and 11-2 are disposed substantially symmetrically as viewed in the longitudinal direction. The flash units include flash lamps 6-1 and 6-2, reflector plates 13-1 and 13-2, and diffusing plates 12-1 and 12-2, respectively, and are oriented toward the original.

When a print key (not shown) of the manipulating field 4 is pressed with the original 1 having been disposed in place, a capacitor (not shown) is electrically charged, whereby the lamp 6-1 is first caused to emit light. After the lighting of the lamp 6-1, the capacitor is again charged, whereby the lamp 6-2 is lit in its turn, whereupon the exposure is ended.

It is desirable that the exposure can be realized in as uniform a distribution as possible over the whole area of the original. However, because of disposition of the lamp 6 within the limited inner space of the apparatus, the plane of the original 1 is located closely to the lamp 6, as the result of which great difficulty is encountered in preventing the unevenness in the exposure with the single lamp 6. For this reason, the lamps are provided at two locations in this apparatus. Further, by lighting the two lamps 6-1 and 6-2 one by one rather than lighting them simultaneously, the light output can be quenched at the time point when the output quantity of light of the lamps as measured has attained a preset quantity of light. Besides, the capacitor may be of a small capacity.

With this apparatus, nonuniformity of exposure over the surface of an original could be substantially eliminated by using two lamps. However, when a high contrast positive film "Polagraph" (trade name) available from Polaroid Company was used and transmission factor of the film was measured after development in succession to the photographing of an original having a constant density, it was found that the transmission factor is nonuniform over the film from front to rear portions thereof. Hence, the sequence of lighting the lamps was reversed. In that case, the transmissivity distribution of the film showed an utterly opposite tendency. The results are shown in FIG. 5.

The front lamp 6-1 tends to illuminate intensively the front surface of the original 1, while the rear lamp 6-2 illuminates more intensively the rear portion of the original 1. Thus, it is seen in view of the characteristics of the film that the portion subjected to the intensive illumination at the first lighting and feeble illumination upon second lighting appears to have been much more exposed than the portion illuminated with feeble light at first and then intensively upon the second lighting.

Under the circumstance, in order to obtain a uniform density at the front portion of the film after development by using the front and rear light sources of the same characteristics, it is taught by the present invention that the amount of exposure attained with the single lighting is decreased, for example, by realizing the exposure with the quantity of light corresponding to one-tenth of the requisite light quantity wherein the lamps are alternately lit ten times to thereby obtain the requisite amount of exposure.

With the exposure described above, an image suffering from no unevenness in density could be obtained without being subjected to any appreciable influence of the reciprocity law failure. In this case, a greater number of repetitive light emissions is preferred. However, since the time required for the photographing becomes longer as the number of the repetition is increased, the latter may preferably be selected in the range of twice to ten times.

FIG. 4 illustrates the situation of concern, in which A represents distribution of the total amount of exposure, B represents distribution of the amount of exposure attained in the 2n−th exposure and C represents the distribution of the amount of exposure attained through in the (2n−1)th exposure wherein n>1.

Incidentally, a phenomenon that dispersion makes appearance in the density of a film after development even for a same amount of exposure in dependence on illuminance with which the film has been exposed (even when the product of illuminance multiplied with time is constant) is generally referred to as the reciprocity law failure. This phenomenon is correctively compensated for by adjusting the aperture of lens in consideration of the exposure time. However, in the case of the exposure system adopted in this apparatus, the above phenomenon can not be corrected solely with the aid of the aperture of lens because the film density differs in dependence on locations.

Further, difference in the reciprocity law failure is observed in dependence on the types of films. However, according to the exposure method as taught herein, there can make appearance no difference in density after development by virtue of the sequential light emissions of the lamps disposed at both ends of the original.

INDUSTRIAL UTILITY

The present invention has been described. According to the exposure system for an image forming apparatus with which the present invention is concerned, the influence of reciprocity law failure can be correctively compensated for due to the exposure realized by alternative light emissions of plural lamps.

I claim:

1. In an image forming apparatus in which a plurality of flash lamps disposed in opposition to and at opposite ends of an original are lit for exposure of the original to obtain a copied image on a light sensitive film, an exposure system characterized in that for attaining a required amount of total exposure on the light sensitive film, the individual flash lamps are alternately lit a plurality of times to produce a series of identical individual exposures whose sum is approximately equal to said total exposure, respectively, even when the requisite total exposure can be obtained by lighting alternately only once each of the flash lamps, to thereby prevent nonuniformity of exposure of the film due to the reciprocity law failure.

2. An image forming apparatus as defined in claim 1 further including a camera for supporting the light sensitive film.

3. An image forming apparatus as defined in claim 2 further including means for directing image bearing light reflected from the original to the light sensitive film supported by said camera.

* * * * *